Dec. 11, 1923.
A. C. GILBERT
ELECTRIC MOTOR
Filed Nov. 26, 1917
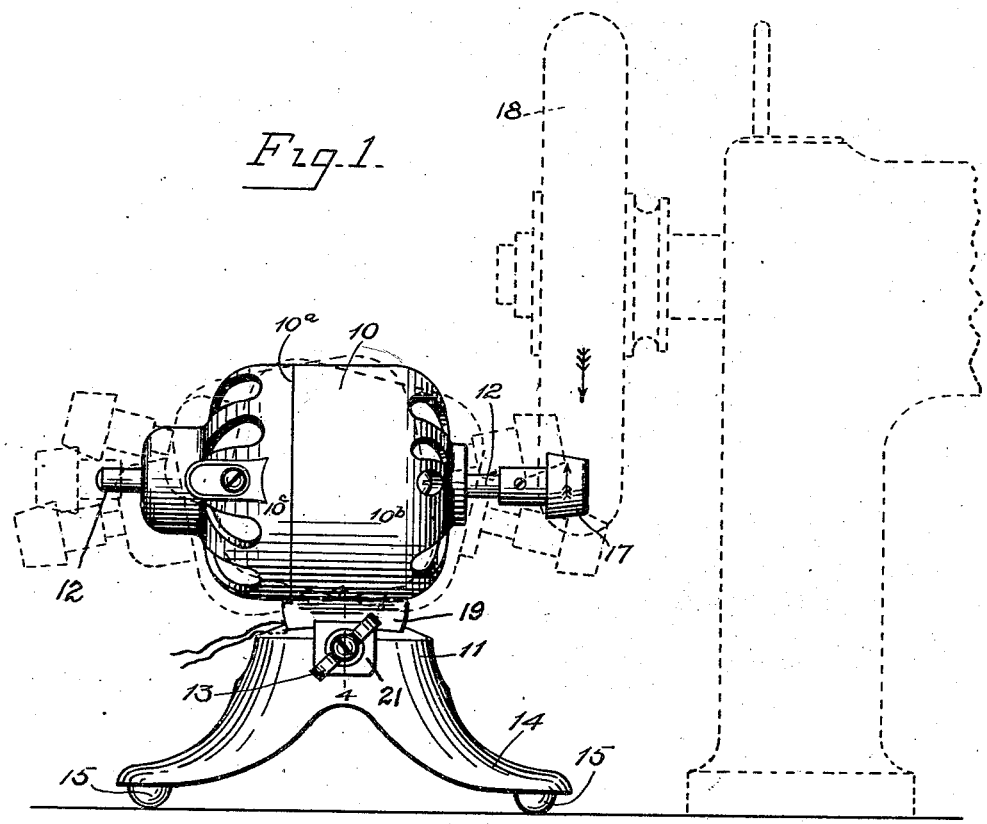
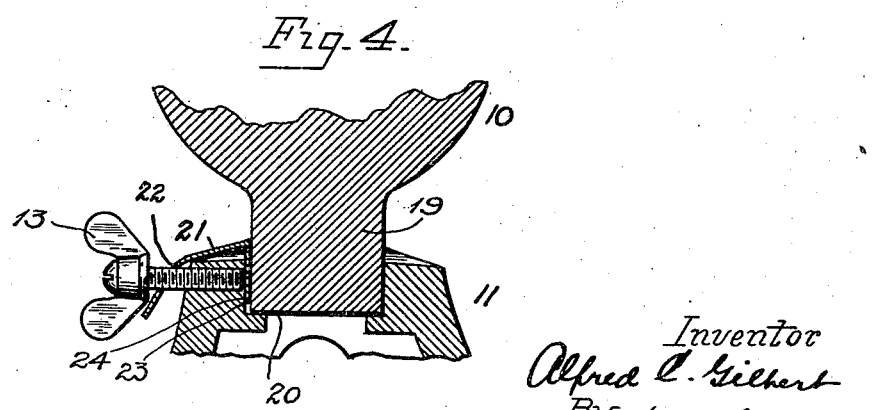

Dec. 11, 1923.
A. C. GILBERT
1,476,708
ELECTRIC MOTOR
Filed Nov. 26, 1917    3 Sheets-Sheet 2
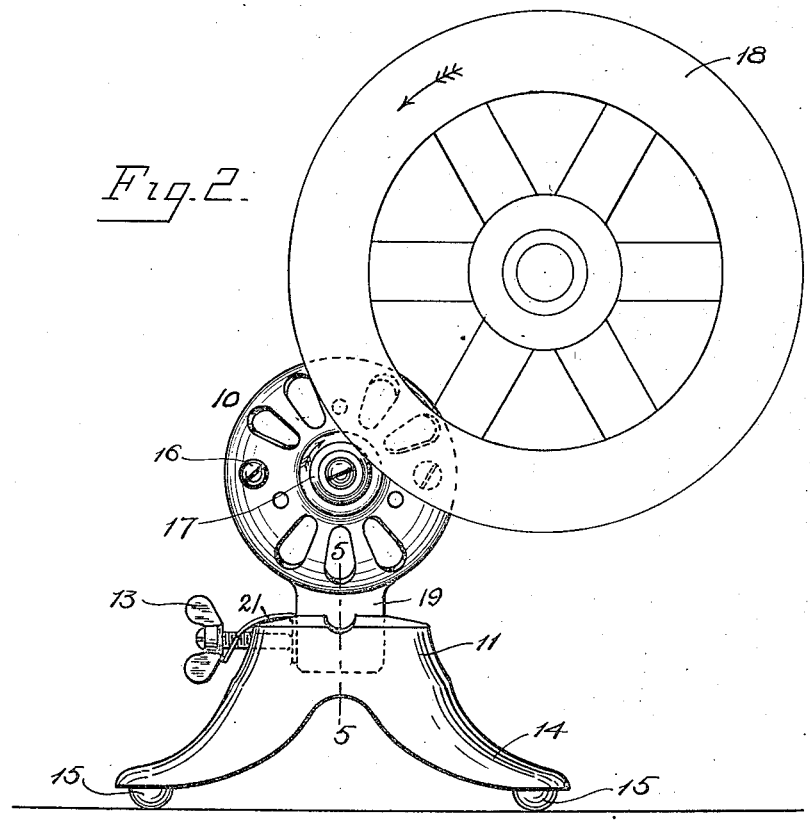
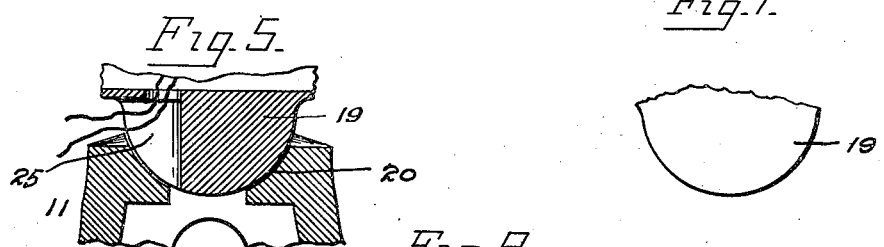
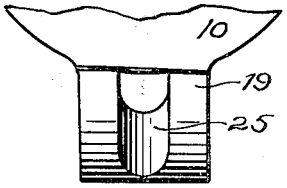

Dec. 11, 1923.
A. C. GILBERT
ELECTRIC MOTOR
Filed Nov. 26, 1917
1,476,708
3 Sheets-Sheet 3
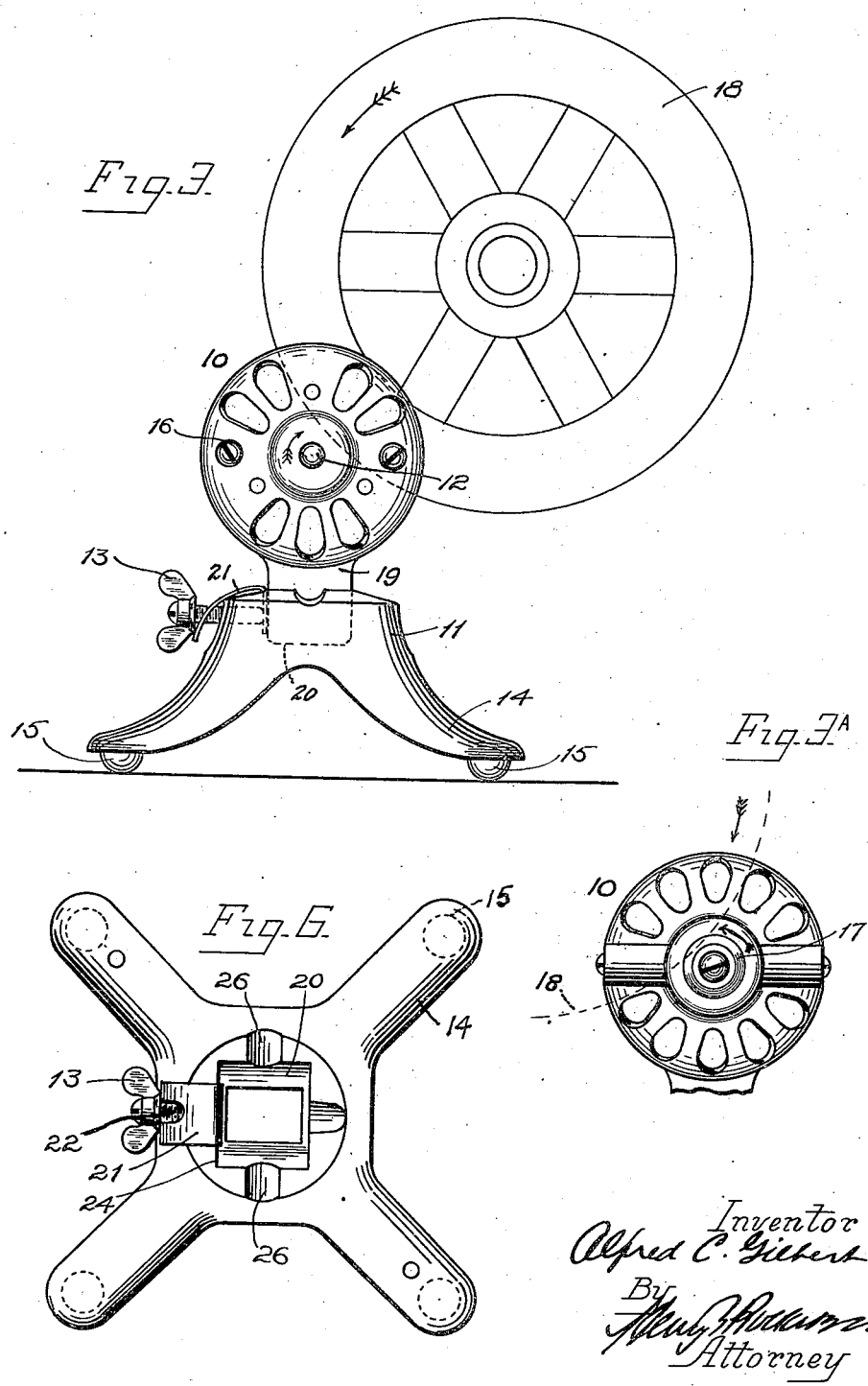

Patented Dec. 11, 1923.

1,476,708

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC MOTOR.

Application filed November 26, 1917. Serial No. 203,974.

*To all whom it may concern:*

Be it known that I, ALFRED C. GILBERT, a citizen of the United States, residing in New Haven, county of New Haven, State of Connecticut, have invented certain new and useful Improvements in Electric Motors, of which the following is a full, clear, and exact description.

This invention relates to electric motors, and more particularly to electric motors for frictionally driving sewing machines and the like.

One of the primary objects of the invention is to provide a portable electric motor of improved and simplified type for driving the hand wheel of a sewing machine by friction. The motor usually rests freely on the table of the sewing machine at one side of the usual hand wheel. The motor has a pulley on the shaft thereof which will frictionally engage the hand wheels of most sewing machines at the sides thereof, and it has a base which is so constructed and arranged that the pulley will maintain its engagement with the machine wheel and will not tend to "walk away" from said wheel when it engages the latter at the side, as stated, although the motor base engages the table of the sewing machine by gravity only and can be readily picked up and removed from the operative position. The improved motor can be very readily placed in the operative position as it is unnecessary to wedge or jam the pulley under the machine wheel, and, therefore the load imposed on the motor is reduced and undue wear of the motor shaft bearings is prevented.

Another object of the invention is to provide an electric motor of the type indicated, in which reversal of the direction of rotation to accord with the different directions of rotation of different sewing machine wheels is unnecessary, and, therefore, as the use of a reversing switch in connection with the motor is dispensed with, the cost of the apparatus is correspondingly reduced. With my improved motor, in changing over from a machine drive in one direction to a drive in the opposite direction, it is merely necessary to turn the motor end for end, and to place the driving pulley on the opposite end of the motor shaft. The motor proper is so mounted relatively to the base that the respective ends of the motor shaft, both of which project out beyond the motor casing, have approximately symmetrical movements of adjustment relatively to the base, and, therefore, an adjustment which is used for driving a machine wheel in one direction may be substantially duplicated in driving another wheel in the opposite direction from the opposite end of the motor shaft.

Another object of the invention is to provide a very simple but efficient form of pivotal connection between the motor and its base.

To these and other ends, the invention consists in the novel features and combinations of parts to be hereinafter described and claimed.

In the accompanying drawings:

Fig. 1 is a side elevation of an electric motor embodying my improvements, showing the same in position on the table of a sewing machine for driving said machine. In this view, the head and wheel of the sewing machine are shown in dotted lines.

Fig. 2 is an end view of the motor, looking from the right-hand side of Fig. 1, with the machine wheel in full lines;

Fig. 3 is an end elevation of the motor, showing it in another adjustment with respect to a sewing machine wheel for driving said wheel in the opposite direction.

Fig. 3ᴬ is a fragmentary view of the pulley end of the motor when the same is adjusted to the position shown in Fig. 3;

Fig. 4 is an enlarged section on the line 4—4 of Fig. 1;

Fig. 5 is an enlarged section on line 5—5 of Fig. 2;

Fig. 6 is a top plan view of the motor base; and

Figs. 7 and 8 are details of the lug on the motor by means of which it is pivoted to the base.

In the particular embodiment shown, my improved electric motor comprises a motor proper 10 mounted on a base 11 to tilt in a vertical plane. The motor proper may be set or clamped in any of a number of angular adjustments in this plane. The plane in question passes through the motor shaft 12, and in one of these adjustments said motor shaft is horizontal, as shown in Fig. 1. The device for clamping or fixing the motor proper relatively to the base may include a clamping screw 13. In the particular form shown, the base is formed of a spider-like casting having four radial legs 14, the lower ends of which are provided with rubber feet 15 which rest on the table of the sewing machine. The interior construction of the member 10 is not a material feature of the invention, but it will be understood that the motor comprises a fixed field magnet and winding within the casing and an armature of the usual type fixed to the shaft 12. In the present instance, the casing of the member 10 is split transversely into two parts along the line 10$^a$, the two sections 10$^b$, 10$^c$ being interconnected by screws 16 or the like. In the particular example illustrated, the brushes (not shown) are mounted within and carried by the section 10$^c$. The motor shaft 12 extends completely through the casing and has bearings in the respective sections thereof, each extremity of the shaft being extended to an appreciable distance beyond the outer face of the corresponding casing section, so that a pulley 17 may be fixed to the shaft at either end thereof.

It may be assumed that in the case illustrated in Figs. 1 and 2, the motor is placed on the table of a sewing machine at a point behind the center of the machine wheel relatively to the front of the sewing machine where the operator sits. The base 11 rests by gravity on the machine table. In the example shown, the motor shaft is substantially horizontal and in parallelism with the axis of the sewing machine wheel 18. The pulley 17 engages the side of the machine wheel somewhat below the center thereof in this case, although in other instances the motor will drive the machine wheel when the pulley is in horizontal alignment with the center of the latter or is located at the upper portion of the periphery of said wheel. As illustrated, however, the pulley engages the periphery of the wheel at such a distance below the center that a line passing through the centers of the motor shaft and wheel shaft is at an angle of approximately 45° to a vertical plane passing through the wheel axis. The pulley engages the machine wheel by friction only. It is undesirable to wedge the pulley against the wheel, because this puts too much of a load on the motor and causes it to slow up, and may even burn it out if too much resistance is encountered. The pulley also engages the machine wheel by friction only because in this manner undue wear of the motor shaft bearings is prevented.

It will be evident that the motor may be very readily placed in the operative position with respect to the machine wheel. The member 10 carrying the motor shaft is first adjusted so that the motor shaft will be preferably horizontal and the motor is then moved into place beside the machine wheel, as shown. The tilting mounting of the member 10 relatively to the base permits the motor shaft to be located horizontally when the base has to be inclined in one or the other direction, and it also permits the motor pulley to be tilted up or down to engage the machine wheel if the pulley does not properly engage said wheel when the shaft is horizontal.

Referring now to the detail construction of the pivotal connection between the motor proper and base, it will be observed that the member 10 has a depending lug 19 which fits in a correspondingly shaped socket 20 in the middle portion of the spider-like base. The lug 19 may be secured to the member 10 in any suitable manner. In practice, it will usually be a separate part secured to the member 10 by screws or the like, but as this particular feature is not material to the present invention I shall not describe it here in further detail. The motor proper and the base are entirely separate from each other and the motor proper, when lifted out of the socket in the base, can be used for a large variety of purposes other than the driving of sewing machines. The pivotal or swinging movement of the motor proper relatively to the base is provided by forming the lower surface of the lug 19 as a part of a cylinder whose axis is directed transversely to the motor shaft, and the socket 20 of the base has a corresponding concave surface which fits the lug. In the form shown, the lug is semi-cylindrical and the socket 20 is correspondingly shaped to provide for a tilting movement of the motor member in a vertical plane which passes through the motor shaft and is parallel to a vertical plane passing through the machine wheel axis. The shaping of the lug 19 in the form of a half cylinder with plain faces perpendicular to the axis of the cylinder, and the socket being shaped correspondingly, always maintains the motor member in the vertical plane in which it swings, while permitting it to move freely in this plane. The construction thus permits of motion similar to that which would be permitted by a horizontal pivot passing through the cylinder, but obviates the actual use of such a separate pivot member. By swinging the motor member in the socket of the base, the pulley 17 may be elevated or depressed, as indicated by the dotted lines in Fig. 1. The set screw 13, previously mentioned, serves to fix the lug 19 rigidly in the socket 20 when the desired adjustment has been obtained. In the particular form shown, the set screw acts against one of the upright side faces of the lug, the axis of said screw being substantially horizontal and the threaded shank thereof passing laterally through one of the side walls of the socket 20. In order to prevent the side face of the lug from being marred by the end of the screw, I prefer to interpose a suitable clamping device between the screw head and the lug, and, in the particular example illustrated, this clamping device consists of a sheet metal plate or shim 21 which has a slot 22 at one end, through which the set screw passes, and a downwardly bent portion 23 at the other end, which extends into the socket 20 in substantial contact with one of the upright side walls 24 thereof. As will be seen from Fig. 4, the motor can be securely clamped to the base in the desired adjustment by tightening the set screw 13, the head of which pushes the lug 19 laterally in the socket 20 and holds one of the upright side faces of the lug in snug frictional engagement with one of the upright side faces of the socket. When it is desired to change the angle of the motor relatively to the base, it is merely necessary to release the set screw 13, whereupon the motor can be readily tipped in its socket in one or the other direction. When the desired adjustment is obtained, the set screw is again tightened to hold the parts rigidly together.

It will be obvious that when the set screw has been loosened, the motor member can be freely lifted out of the socket in the base. The detachment of the two parts can be very readily effected, and when the motor has been lifted from the base, it can be used for various purposes where the base is not required.

The lug 19, in the example illustrated, is provided with an opening 25, through which the conducting wires for the motor pass, as shown in Fig. 5. The top of the base at one end of the socket 20 is provided with a groove 26, which is adapted to register with the opening 25 in the lug, and which provides a clearance space for the conductor wires when the motor is tilted downwardly at that end of the base socket. At the opposite end of the socket a similar groove 26 is provided, which will act in the same manner when the motor is turned end for end in the base. It will be observed that the lug 19 and the base socket are so shaped that they will fit each other whether one end of the motor member is located at one side of the base or at the other side. Thus, two distinct angular adjustments of the motor member relatively to the base are permitted (in both of which, however, the motor shaft is transverse to the longitudinal axis of the lug and socket), and the facility of assembling the motor and base is correspondingly increased. In the present example, the base is square and the legs are symmetrically disposed. When the motor member is placed in the base socket, it may be freely turned in a vertical plane passing through the motor shaft, so as to tilt the motor pulley up and down, and this is true whether the motor is set in the socket in the manner shown in Fig. 1, or is turned through 180° in a horizontal plane. In both cases, the lug fits the socket and the set screw clamps the parts together.

The motor shaft 12, as previously stated, extends beyond the respective end faces of the motor casing, and the pulley 17 can be applied to either end of said shaft. This is a feature of advantage when the motor is used for various purposes, but particularly where the motor is used for driving a sewing machine. In different makes of sewing machines, the wheels are intended to rotate in different directions. Fig. 2 shows the case where the machine wheel, looking from the left-hand end of the machine, rotates in a counter-clockwise direction. In such a case the motor is used in substantially the position shown in Fig. 2; that is to say, at the rear of the machine wheel relatively to the operator of the machine. The motor shaft rotates clock-wise as viewed in Fig. 2, and, the pulley 17 being located somewhat below the center of the machine wheel axis, the direction of rotation of the wheel is such as not to cause the motor to "walk away" from the wheel. The weight of the base is sufficient to maintain the pulley in the desired frictional contact with the wheel periphery. The direction of rotation of the machine wheel is such as not to cause the motor to be thrown outward from the wheel. This might take place if the wheel rotated in the opposite direction. In order to apply my improved motor to a sewing machine wherein the hand wheel rotates in a direction opposite to that first described, the pulley is placed on the opposite end of the motor shaft, and the motor is arranged as shown in Figs. 3 and 3ᴬ. Fig. 3ᴬ corresponds to Fig. 2, and shows the motor arranged at the front side of the wheel with the pulley somewhat below the center of the wheel axis. In this case, the machine wheel rotates clockwise, as shown in Fig. 3ᴬ, and the pulley rotates counter-clockwise. Here also the side of the machine wheel at which the motor is placed is so chosen that the motor will not "walk away" from the wheel, because there is no tendency of the latter to shift the motor outward.

It will, therefore, be understood that my invention provides for the driving of the machine wheel in either of two directions, in spite of the fact that no switch for reversing the direction of the motor shaft is provided.

It will be understood, of course, that the clamping device 21. 22 does not interfere with the reversal of the motor member in the base member so as to provide for turning the motor shaft laterally through 180° without turning the base, and that the clamping device will clamp the parts together properly whether the motor member is in the original position or the reversed position relatively to the base. In other words, the clamping device will act on either side face of the lug 19. In the form shown, the side faces of the lug are both flat and upright and symmetrically located with respect to the center of the motor, and the side faces of the socket 20 are correspondingly shaped.

Various changes may be made in the details of the construction without departing from the scope of the invention as defined in the claims.

It will be understood that any well-known form of detachable drive pulley or wheel may be employed, for example, one having an attaching sleeve with a screw for clamping it removably on the shaft. The pulley will preferably have a cork body to engage the driven part without undue slipping.

What I claim is:

1. An electric motor for driving a sewing machine or the like, comprising a motor shaft, a motor casing in which said shaft is journalled and beyond which said shaft projects at both ends, a friction pulley applicable to either end of the shaft and adapted to drive a sewing machine wheel by frictional engagement therewith, a base having elastic feet adapted to rest on top of the machine table, said motor casing being mounted on said base to swing in a vertical plane, and means for clamping said casing rigidly to the base in the desired adjustment.

2. The combination with a machine to be driven, having a table and a rotary wheel above said table, of an electric motor for driving said wheel, comprising a motor shaft, a motor casing in which said shaft is journalled, a friction pulley applicable to either end of the motor shaft adapted to drive the machine wheel by frictional engagement therewith, a base resting by gravity on the table below and to one side of the axis of the machine wheel, and adjustable means for securing said motor casing on said base so that the casing may be tilted in a vertical plane passing through said shaft and means to clamp said casing in adjusted position.

3. The combination with a machine to be driven, having a table and a rotary wheel above said table, of an electric motor for driving said wheel, comprising a motor shaft, a motor casing in which said shaft is journalled, a friction pulley applicable to either end of the motor shaft and adapted to engage the machine wheel frictionally to drive the same, a relatively flat spiderlike base resting by gravity on the table below and to one side of the wheel axis, said motor casing being mounted on said base so that said casing can be tilted in a vertical plane to engage said friction pulley with the periphery of said wheel at a point below and to one side of the wheel axis, and clamping means securing the motor casing rigidly to the base in the desired adjustment.

4. The combination with a machine to be driven, having a table and a rotary wheel above said table, of an electric motor for driving said wheel, comprising a motor shaft, a motor casing in which said shaft is journalled, a friction pulley on the end of the motor shaft adapted to engage the machine wheel frictionally to drive the same, a relatively flat spiderlike base resting by gravity on the table below and to one side of the wheel axis, said motor casing being mounted on said base so that said casing can be tilted in a vertical plane to engage said friction pulley with the periphery of said wheel at a point below and to one side of the wheel axis, and clamping means securing the motor casing rigidly to the base in the desired adjustment, said motor shaft projecting at both ends beyond the motor casing, and said friction pulley being applicable to either end of the shaft whereby the machine wheel can be driven in different directions without reversing the motor.

5. In an electric motor, a spiderlike base having a segmentally shaped socket open at the upper surface of the base, said base having feet of soft material for engaging a sewing machine table, a separate motor member having a part engaging and rocking upon the bottom of the socket of the base to mount the motor member for pivotal swinging movement therein, and clamping means located wholly outside of said socket engaging part for clamping the motor member to the base.

6. In an electric motor, a base, a motor member, one of said parts having a socket, and the other part having a projecting member provided with a plane face entering and fitting said socket to mount the motor for pivotal swinging movement upon the base, and means engageable with said face of said last named member, in abutting relation to the same, for clamping the parts together.

7. In an electric motor, a base, a motor member, one of said parts having a socket, and the other part having a projecting member provided with a plane face entering and fitting said socket to mount the motor for tilting adjustment upon the base, and means engageable with said face of said last named member in abutting relation to the same, for clamping the parts together in various adjusted positions, said socket engaging member being withdrawable from said socket when said clamping means is moved out of abutting relation to said socket engaging member.

8. In an electric motor, a base, a motor member, one of said parts having a socket, and the other part having a projecting member provided with a plane face entering and fitting said socket, and means engageable with said face of said last named member, in abutting relation to the same, for clamping the parts together, said socket engaging member being withdrawable from said socket when said clamping means is moved out of abutting relation to said socket engaging member, said clamping means being located wholly outside of said socket engaging member.

9. In an electric motor, a base having a segmental socket with two opposite side walls, a motor member having a segmental lug engaging said socket between said side walls, and clamping means carried wholly by the base and located outside of said lug, but in abutting relation therewith, for clamping the motor member to the base by frictionally engaging one side face of the lug with the opposing side face of the socket.

10. In an electric motor, a motor member, a base, one of said parts having a lug provided with a plane face and the other part having a socket in which said lug engages, and clamping means, comprising a clamping screw, in abutting relation to said face of said lug for clamping the parts together.

11. In an electric motor, a motor member, a base, one of said parts having a socket with a cylindrical lower surface and substantially vertical side surfaces, the other part having a lug with a cylindrical lower part fitting the cylindrical lower surface, whereby the motor member is adapted to be tilted in a vertical plane, and means independent of said lug and associated with one of the side walls of the socket for clamping the parts together.

12. In an electric motor, a motor member, a base, one of said parts having a socket with a cylindrical lower surface and substantially vertical side surfaces, the other part having a lug with a cylindrical lower part engaging the cylindrical lower surface, whereby the motor member is adapted to be tilted in a vertical plane, and means independent of said lug and associated with one of the side walls of the socket for clamping the parts together, said clamping means located wholly outside of said lug in abutting relation to one of the side faces of the lug, and the lug being freely withdrawable from the socket when the clamping means is withdrawn slightly from the side face of the lug.

13. In an electric motor, a motor member and a base, one of said parts having a lug, and the other part having a correspondingly shaped socket provided with plane walls between which said lug fits, the contacting surfaces of said lug and socket being so shaped as to provide for a tilting movement of the motor member in one plane only relatively to the base without the employment of a separate pivot member.

14. In an electric motor, a motor member having a projecting lug, a spiderlike base having a socket open at the top of the base, said socket having plane side walls between which said lug fits, the bottom of the lug and the bottom of the socket being shaped to provide for a tilting movement of the motor member relatively to the base in one plane only without the employment of a separate pivot member.

15. In an electric motor, a motor member having a projecting lug, a spiderlike base having a socket open at the top of the base, said socket having plane side walls between which said lug fits, the bottom of the lug and the bottom of the socket being shaped to provide for a tilting movement of the motor member relatively to the base in one plane only without the employment of a separate pivot member, and means associated with the base and located outside of said lug in abutting relation to the latter for clamping the parts together.

16. In an electric motor, a base having a socket, and a motor member having a projecting lug fitting said socket, the contacting surfaces of the lug and socket being shaped to provide for a tilting movement of the motor relatively to the base in one plane only.

17. In an electric motor, a base having a socket with plane side walls, and a motor member having a projecting lug provided with a side face fitting said socket, the contacting surfaces of the lug and socket being so shaped as to provide for a tilting movement of the motor relatively to the base, and a clamping member associated with the base arranged to clamp the parts together by engaging a side face of the lug, whereby the motor member can be withdrawn from the base as soon as said clamping member is slightly retracted from the lug face.

18. In an electric motor, a base member, a motor member, one of said members having a socket with a curved bottom and a straight side face, the other member having a lug with a curved bottom engaging the socket bottom and with a side face adjacent the side face of the socket, and clamping means acting laterally on the lug to force its side face into tight frictional engagement with that of the socket, said lug being reversible end for end in said socket independently of said clamping means.

19. In an electric motor, a base member having a socket in the upper part thereof, with a curved bottom and a substantially upright side face, a motor member having a depending lug freely set in said socket, said lug having a curved lower face engaging the socket bottom and having a side face in close proximity to that of said socket, and a clamping device passing through one side wall of the socket and adapted to force the side face of said lug into tight frictional engagement with that of the socket, said lug being reversible in said socket.

20. An electric motor comprising a base member, a motor member, one of said members having a segmental socket and the other having a correspondingly shaped lug entering said socket, and a clamping screw cooperating with said lug but located outside the same for clamping the motor member to the base in any of a plurality of angular adjustments about a horizontal axis, said motor member being freely liftable from said base when said clamping means is loosened.

In witness whereof, I have hereunto set my hand on the 23d day of November, 1917.

ALFRED C. GILBERT.